(12) United States Patent
Kanazashi

(10) Patent No.: US 7,724,859 B2
(45) Date of Patent: May 25, 2010

(54) SYNCHRONIZING APPARATUS AND SYNCHRONIZING METHOD

(75) Inventor: Kazuyuki Kanazashi, Kawasaki (JP)

(73) Assignee: Fujitsu Microelectronics Limited, Yokohama (JP)

( * ) Notice: Subject to any disclaimer, the term of this patent is extended or adjusted under 35 U.S.C. 154(b) by 907 days.

(21) Appl. No.: 11/442,993

(22) Filed: May 31, 2006

(65) Prior Publication Data

US 2007/0183548 A1    Aug. 9, 2007

(30) Foreign Application Priority Data

Feb. 9, 2006    (JP) .............................. 2006-032975

(51) Int. Cl.
*H04L 7/00* (2006.01)
(52) U.S. Cl. ................. 375/368; 375/354; 370/509
(58) Field of Classification Search ................. 375/354, 375/365, 366, 368, 373; 370/503, 509–513
See application file for complete search history.

(56) References Cited

U.S. PATENT DOCUMENTS 5,867,503 A * 2/1999 Ohsuga et al. .............. 714/704
6,097,766 A   8/2000 Okubo et al.
6,353,358 B1 * 3/2002 Yoshie ....................... 329/304
6,526,107 B1 * 2/2003 Katoh et al. ................ 375/368

FOREIGN PATENT DOCUMENTS

JP    11-136300    5/1999
JP    2000-278344    10/2000
JP    2001-057549    2/2001

OTHER PUBLICATIONS

Korean Patent Office Notice of Preliminary Rejection, mailed Jun. 28, 2007 and issued in corresponding Korean Patent Application No. 10-2006-0048453.

* cited by examiner

*Primary Examiner*—Dac V Ha
(74) *Attorney, Agent, or Firm*—Fujitsu Patent Center

(57) ABSTRACT

A synchronizing apparatus comprises a normal lock synchronization detecting unit for detecting synchronization by detecting from demodulated data a synchronization pattern in a normal lock state, and a pseudo lock synchronization detecting unit for detecting synchronization by detecting from the demodulated data a synchronization pattern in a pseudo lock state.

13 Claims, 22 Drawing Sheets

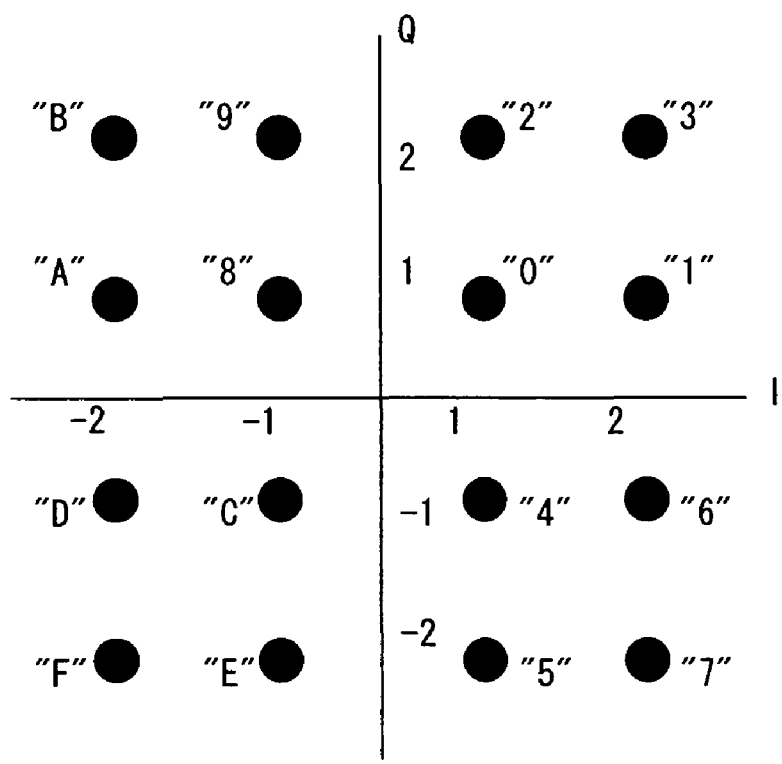
F I G. 3

```
          *
      ⎴⎴⎴
11010101110000001111111111111011011100111
◆——————◆ D5
   ◆——————◆ AB
      ◆——————◆ 57
         ◆——————◆ B8
```

F I G. 1 0

ORIGINAL DATA 0xB8   1 0 1 1 _ 1 0 0 0

0-BIT SHIFT
|0 0|1 1 _ 1 0 0 0  → 0x38
|0 1|1 1 _ 1 0 0 0  → 0x78
|1 0|1 1 _ 1 0 0 0  → 0xB8
|1 1|1 1 _ 1 0 0 0  → 0xF8

1-BIT SHIFT
1|0 0|1 _ 1 0 0 0  → 0x98
1|0 1|1 _ 1 0 0 0  → 0xB8
1|1 0|1 _ 1 0 0 0  → 0xD8
1|1 1|1 _ 1 0 0 0  → 0xF8

2-BIT SHIFT
1 0|0 0|_ 1 0 0 0  → 0x88
1 0|0 1|_ 1 0 0 0  → 0x98
1 0|1 0|_ 1 0 0 0  → 0xA8
1 0|1 1|_ 1 0 0 0  → 0xB8

3-BIT SHIFT
1 0 1|0 _ 0|0 0 0  → 0xA0
1 0 1|0 _ 1|0 0 0  → 0xA8
1 0 1|1 _ 0|0 0 0  → 0xB0
1 0 1|1 _ 1|0 0 0  → 0xB8

4-BIT SHIFT
1 0 1 1 _|0 0|0 0  → 0xB0
1 0 1 1 _|0 1|0 0  → 0xB4
1 0 1 1 _|1 0|0 0  → 0xB8
1 0 1 1 _|1 1|0 0  → 0xBC

5-BIT SHIFT
1 0 1 1 _ 1|0 0|0  → 0xB8
1 0 1 1 _ 1|0 1|0  → 0xBA
1 0 1 1 _ 1|1 0|0  → 0xBC
1 0 1 1 _ 1|1 1|0  → 0xBE

6-BIT SHIFT
1 0 1 1 _ 1 0|0 0|  → 0xB8
1 0 1 1 _ 1 0|0 1|  → 0xB9
1 0 1 1 _ 1 0|1 0|  → 0xBA
1 0 1 1 _ 1 0|1 1|  → 0xBB

7-BIT SHIFT
|0|0 1 1 _ 1 0 0|0|  → 0x38
|0|0 1 1 _ 1 0 0|1|  → 0x39
|1|0 1 1 _ 1 0 0|0|  → 0xB8
|1|0 1 1 _ 1 0 0|1|  → 0xB9

F I G.  1 6

|  | EXPECTED VALUE "B8" | EXPECTED VALUE "47" |
| --- | --- | --- |
| NO BIT SHIFT | 83 | 5E |
| 1-BIT SHIFT | 24 | C3 |
| 2-BIT SHIFT | 7A | 09 |
| 3-BIT SHIFT | 1B | 20 |
| 4-BIT SHIFT | 29 | F4 |
| 5-BIT SHIFT | 71 | 9F |
| 6-BIT SHIFT | D4 | A3 |
| 7-BIT SHIFT | CE | 76 |

F I G. 1 7

ORIGINAL DATA 0xB8    1 0 1 1 _ 1 0 0 0
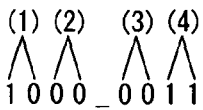
0-BIT SHIFT
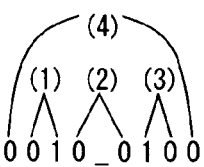
1-BIT SHIFT
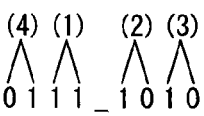
2-BIT SHIFT
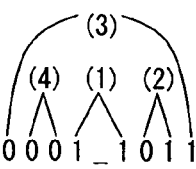
3-BIT SHIFT
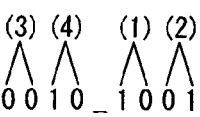
4-BIT SHIFT
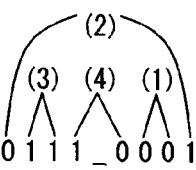
5-BIT SHIFT
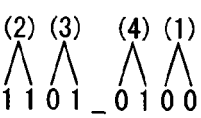
6-BIT SHIFT
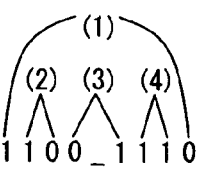
7-BIT SHIFT
F I G.  1 8

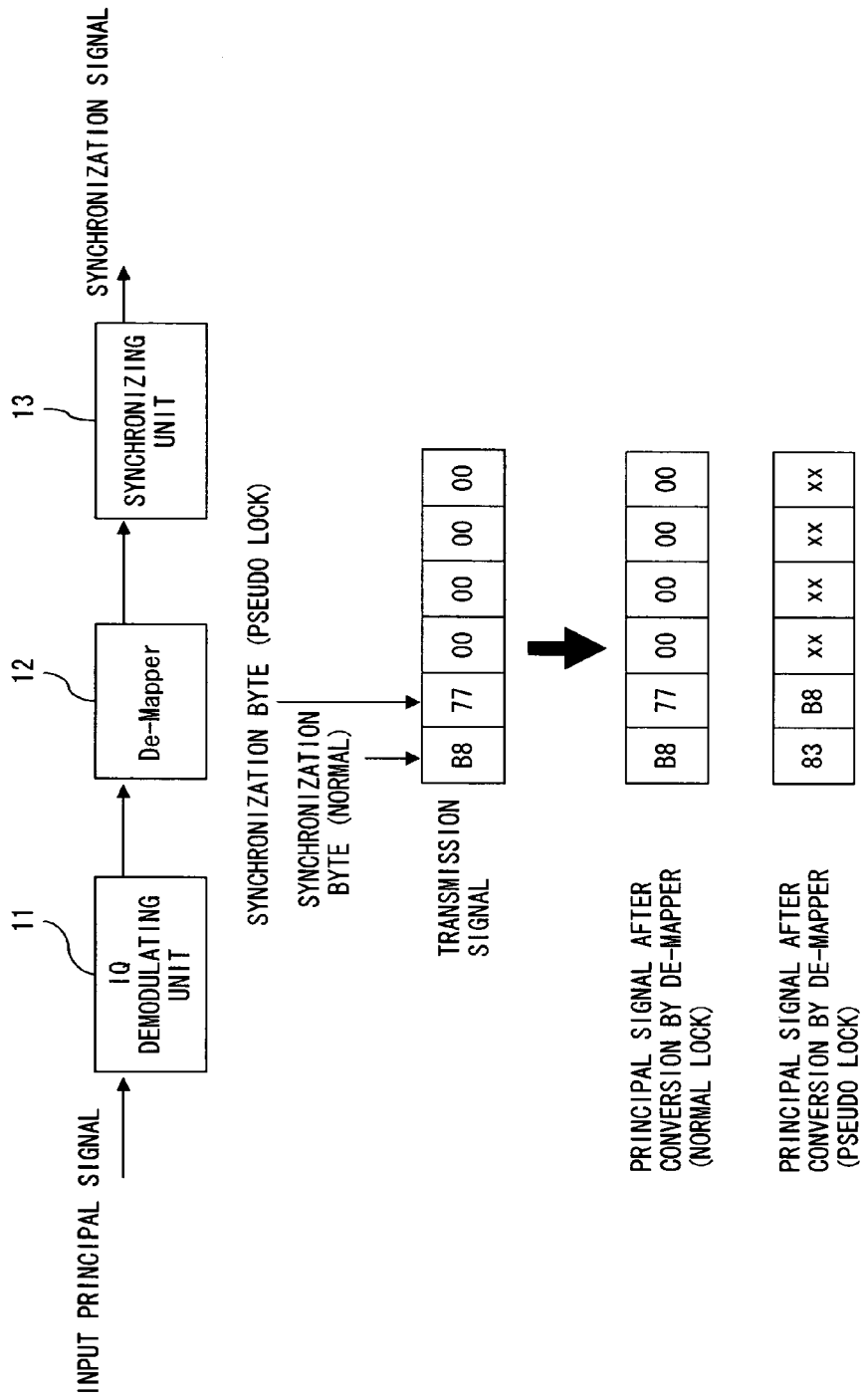
F I G. 2 1

SYNCHRONIZING APPARATUS AND SYNCHRONIZING METHOD

CROSS-REFERENCE TO RELATED APPLICATIONS

This application is based upon and claims the benefit of priority from the prior Japanese Patent Application No. 2006-032975 filed on Feb. 9, 2006, the entire contents of which are incorporated herein by reference.

BACKGROUND OF THE INVENTION

1. Field of the Invention

The present invention relates to an apparatus for detecting synchronization by detecting a synchronization pattern from data demodulated by a demodulating unit in which a pseudo lock can occur, and a method thereof.

2. Description of the Related Art

Conventionally, there is a system for digital-modulating/demodulating and transmitting data. The receiving side of this system demodulates a received signal in a demodulating unit, and detects synchronization (takes synchronization) by detecting a synchronization pattern from the demodulated data.

For example, assume that one frame of transmission data is configured by eight packets each of which is composed of 204 bytes, the first byte of the first packet is a synchronization byte "B8", and the first bytes of the remaining 7 packets are respectively "47" as shown in FIG. 1. In this case, taking synchronization means the detection, from demodulated data, of the beginning of a frame by recognizing a pattern of synchronization bytes such as "B8", "47", "47", . . . .

If the synchronization byte "B8" shown in (a) can be detected when the transmission data shown in FIG. 1 is obtained as demodulated data, the synchronization byte subsequently exists every 204 bytes. Therefore, frame synchronization can be taken and no problems are posed if the synchronization byte continues to be detected.

However, the values "B8" and "47", which are the synchronization bytes, naturally exist also as data. Accordingly, if "B38" shown in (b) is detected as a synchronization byte, the synchronization byte "47" does not exist after 204 bytes from "B38", leading to a detection miss of the synchronization byte. Therefore, the recognition of the pattern of synchronization bytes is remade from scratch. Additionally, even if the recognition is remade from scratch, the byte detected next as the synchronization byte is not always the normal synchronization byte, which can possibly cause the repetition of a detection miss of the synchronization byte.

Thus, Patent Document 1 (Japanese Patent Publication No. 2001-057549) proposes an apparatus for preventing the recognition of a pattern of synchronization bytes from being remade from scratch at a time point when a detection miss of a synchronization byte occurs, by providing a plurality of synchronization state machines each of which does not detect the same position of a synchronization byte.

As a factor to delay frame synchronization, an occurrence of pseudo lock is cited. The pseudo lock is a phenomenon that a carrier reproduction loop within a demodulating unit locks in a pseudo manner in a state where a phase shifts in units of 90° such as 90°, 180°, or 270° relative to an expected value.

One example of the pseudo lock in a case where a phase shifts in units of 90° every one symbol is described with reference to FIG. 2. The example shown in this figure is an example of the case of QPSK (Quadrature Phase Shift Keying).

Here, assume that data "0" exists in the first quadrant in a normal lock state as shown on an IQ (I: In phase, Q: Quadrature phase) plane of the upper left of FIG. 2. In this case, the data "0", which should originally exist in the first quadrant, moves to the second quadrant as shown on the IQ plane of the upper right of FIG. 2 if the phase shifts by 90° (rotates by 90° in the counterclockwise direction) after one symbol. If the phase further shifts by 90° after the next one symbol (after two symbols), the data "0", which should originally exist in the first quadrant, moves to the third quadrant as shown on the IQ plane of the lower right of FIG. 2. If the phase still further shifts by 90° after the next one symbol (after 3 symbols), the data "0", which should originally exist in the first quadrant, moves to the fourth quadrant as shown on the IQ plane of the lower left of FIG. 2. Then, if the phase still further shifts by 90° after the next one symbol (after 4 symbols), the data "0" restores to the original state. Thereafter, this state transition is repeated every one symbol. Even if the phase shifts by 90°, 180° (90°×2), or 270° (90°×3) relative to an expected value as described above, it is determined that the normal lock occurs in the demodulating unit. This is because the position where the symbol point exists does not shift although its data differs. However, in this example, the data in the first quadrant makes a transition of "0"→"3"→"2"→"1" every one symbol. Accordingly, it cannot be expected that the synchronization bytes "B38" and "47" are not normally output from the demodulating unit, which naturally leads to unsuccessful frame synchronization.

In the meantime, in a case of QAM (Quadrature Amplitude Modulation), multilevel data is represented by the amplitudes (levels) of I and Q axes as in the case of 16QAM shown in FIG. 3. For example, if the amplitudes of I and Q are respectively 2, 3 is presented as data.

Here, an example of a case of 16QAM, in which a phase shifts in units of 90° every one symbol, is described with reference to FIGS. 3 and 4 as another example of the pseudo lock.

Originally, one packet is configured by a synchronization byte and data. Here, explanation is provided by assuming that one packet is configured only by a synchronization byte for ease of explanation. Additionally, although the synchronization byte in the above description is configured by 8 bits such as "B8" and "47", the synchronization byte is assumed to be configured only by low-order 4 bits here.

In FIG. 4, in a normal lock state, when the synchronization byte is output in accordance with a symbol clock, normal synchronization bytes are output as shown in "normal lock" in this figure, and frame synchronization successfully completes.

However, since the phase rotates in the pseudo lock state as describe above, values like expected values are not output, and those shown in the "pseudo lock" in this figure are output.

Here, assume that data "8" is output in the pseudo lock state when I and Q are −1 and 1 respectively on the symbol clock (1). In this case, I and Q become 2 and −2 respectively, and data "7" is output on the symbol clock (2) in the normal lock state, whereas I and Q become 2 and 2 respectively due to the phase rotated by 90° in the counterclockwise direction, and data "3" is output in the pseudo lock state.

Additionally, on the symbol clock (3), I and Q become 2 and −2 respectively and data "7" is originally output in the normal lock state, but the phase further rotates by 90° in the counterclockwise direction, and I and Q become −2 and 2 respectively, and data "B" is output in the pseudo lock state. At this time, the phase shifts by 180°, because it proceeds by 2 clocks from the original position of "7".

Furthermore, on the symbol clock (4), I and Q become 2 and −2 respectively and data "7" is output in the normal lock state, but the phase still further rotates by 90° in the counter-clockwise direction, and I and Q become −2 respectively, and data "F" is output in the pseudo lock state. At this time, the phase shifts by 270°, because it proceeds by 3 clocks from the original position of "7".

On the symbol clock (5), the phase comes full circle, and restores to the original position. Therefore, I and Q become 2 and −2 respectively, and data "7" is output.

Since data output from the demodulating unit is destroyed in the pseudo lock state as described above, frame synchronization cannot be taken as it is.

Accordingly, a conventional process for once releasing a lock and for making a lock again occur is performed with a predetermined control, if pseudo lock occurs and frame synchronization cannot be taken within a predetermined time period.

Additionally, for frame synchronization enabled to be taken in a shorter time, by way of example, Patent Document 2 (Japanese Patent Publication No. 2000-278344) proposes a quadrature phase demodulating circuit, which detects pseudo lock by detecting that a carrier reproduction loop is locked and a frame of a baseband signal is asynchronous, in order to quickly detect an occurrence of the pseudo lock.

However, when the pseudo lock once occurs, the process for once releasing a lock and for making a lock again occur is conventionally performed as described above. Therefore, the process is again performed, which causes a wasteful overhead. Furthermore, there is no guarantee that the normal lock state occurs next.

SUMMARY OF THE INVENTION

It is an object of the present invention to provide a synchronizing apparatus for reducing an overhead caused by pseudo lock, and a method thereof in consideration of the above described circumstances.

To achieve the above described object, a synchronizing apparatus according to a first aspect of the present invention detects synchronization by detecting from demodulated data a synchronization pattern in a normal lock state and/or a synchronization pattern in a pseudo lock state.

A synchronizing apparatus according to a second aspect of the present invention comprises: a normal lock synchronization detecting unit for detecting synchronization by detecting from the demodulated data the synchronization pattern in the normal lock state; and a pseudo lock synchronization detecting unit for detecting synchronization by detecting from the demodulated data the synchronization pattern in the pseudo lock state, in the first aspect.

A synchronizing apparatus according to a third aspect of the present invention comprises: a synchronization pattern detecting unit for detecting from the demodulated data the synchronization pattern in the normal lock state or the synchronization pattern in the pseudo lock state; and a synchronization detecting unit for detecting synchronization by detecting a subsequent synchronization pattern in the normal lock state every predetermined data amount when the synchronization pattern detecting unit detects the beginning of the synchronization pattern in the normal lock state, or for detecting synchronization by detecting a subsequent synchronization pattern in the pseudo lock state every predetermined data amount when the synchronization pattern detecting unit detects the beginning of the synchronization pattern in the pseudo lock state, in the first aspect.

A synchronizing apparatus according to a fourth aspect of the present invention, the apparatus being provided on a receiving side of a system for modulating/demodulating and transmitting data, in which a data pattern that becomes the same value as the synchronization pattern when being demodulated in the pseudo lock state on the receiving side is inserted as a data pattern that succeeds immediately after the synchronization pattern, comprises: a synchronization detecting unit for detecting synchronization by detecting the synchronization pattern in the normal lock state; a determining unit for determining the pseudo lock state by detecting the synchronization pattern in the pseudo lock state; and an adjusting unit for adjusting a synchronization position when said synchronization detecting unit detects synchronization and said determining unit determines the pseudo lock state, in the first aspect.

A synchronizing apparatus according to a fifth aspect of the present invention, which is provided on a receiving side of a system for modulating/demodulating and transmitting data having a configuration where a fixed data pattern succeeds immediately after a synchronization pattern, comprises: a synchronization pattern detecting unit for detecting a synchronization pattern from demodulated data; a data pattern obtaining unit for obtaining a data pattern that succeeds immediately after the synchronization pattern detected by the synchronization pattern detecting unit; and a determining unit for determining whether synchronization is taken either in the normal lock state or in the pseudo lock state according to the data pattern obtained by the data pattern obtaining unit.

A synchronizing method according to a sixth aspect of the present invention comprises: detecting synchronization by detecting from demodulated data a synchronization pattern in a normal lock state or a synchronization pattern in a pseudo lock state; and determining whether the synchronization is detected either in the normal lock state or in the pseudo lock state according to the detection result of the synchronization.

BRIEF DESCRIPTION OF THE DRAWINGS

FIG. 3 shows a correspondence between I, Q and data in a case of 16QAM;

FIG. 10 shows one example of serial data;

FIG. 16 shows a pattern when high-order 2 bits of data represented by one symbol change in each of 0-, 1-, 2-, 3-, 4-, 5-, 6-, and 7-bit shifts for a synchronization byte "B38" in the case of 256QAM;

FIG. 17 shows a pattern of a synchronization byte in the pseudo lock state in consideration of a bit shift detected by a synchronizing unit according to a second preferred embodiment;

FIG. 18 shows a pattern in the pseudo lock state in consideration of a bit shift for the synchronization byte "B38";

FIG. 21 explains one example of operations when a process is performed by inserting a synchronization byte assuming the pseudo lock in transmission data.

DESCRIPTION OF THE PREFERRED EMBODIMENTS

Preferred embodiments according to the present invention are hereinafter described with reference to the drawings.

First Preferred Embodiment

Figure 1:
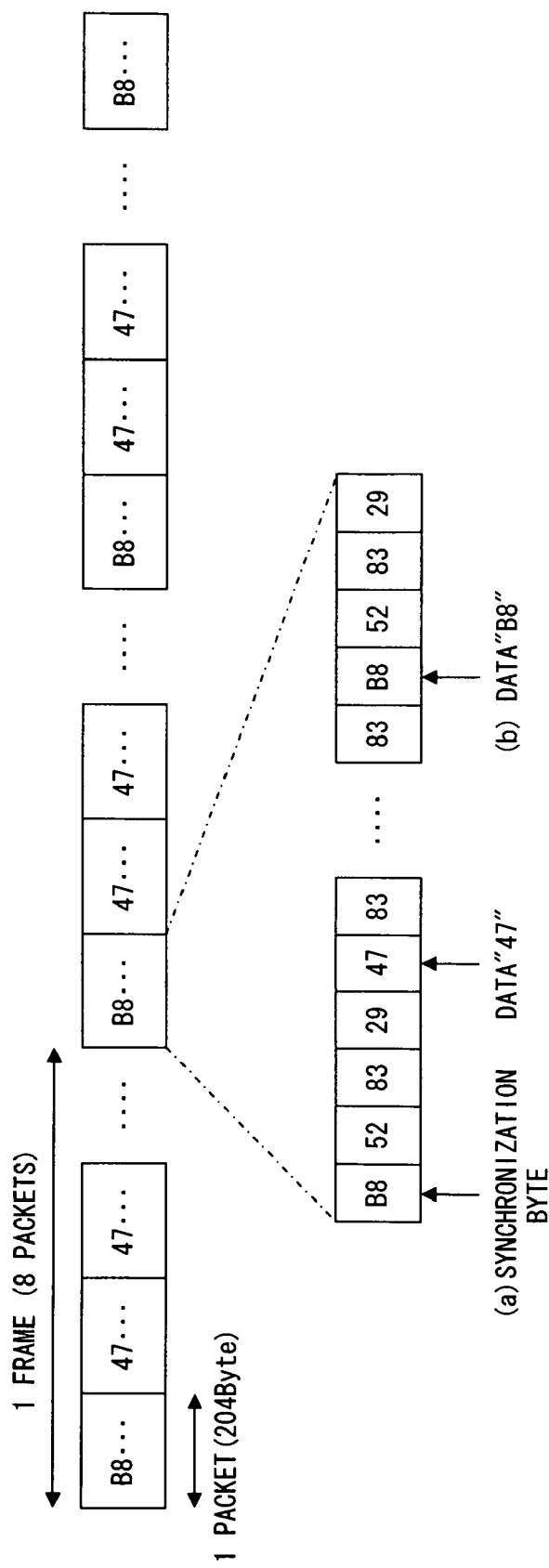
FIG. 1 shows one example of a frame configuration of transmission data.
Figure 5:
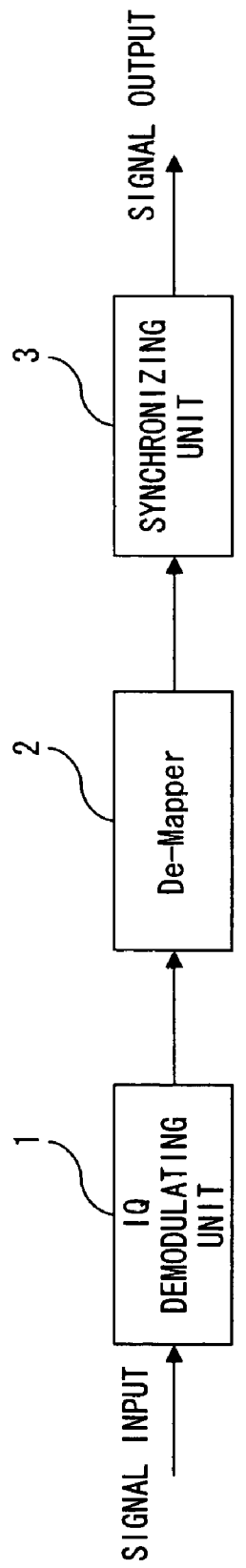
FIG. 5 shows a portion of a configuration of a receiving device comprising a synchronizing unit, which is a synchronizing apparatus according to a first preferred embodiment.

FIG. 5 shows a portion of a configuration of a receiving device comprising a synchronizing unit, which is a synchronizing apparatus according to a first preferred embodiment of the present invention. This receiving device is a receiving device in a system for digital-modulating/demodulating and transmitting data. The configuration of data to be transmitted is assumed to be the same as that shown in the above described FIG. 1.

In FIG. 5, an IQ demodulating unit 1 of a synchronization detecting method demodulates a received signal, and outputs parallel data of I and Q components (hereinafter referred to simply as I and Q). A De-Mapper 2 converts the parallel data of I and Q into serial data, and outputs the converted data. In this preferred embodiment, the IQ demodulating unit 1 and the De-Mapper 2 are defined to configure a demodulating unit. Accordingly, the serial data output from the De-Mapper 2 is also demodulated data.

A synchronizing unit 3 detects frame synchronization by detecting a synchronization pattern in a normal lock state or a synchronization pattern in a pseudo lock state from the demodulated data output from the De-Mapper 2. Additionally, the synchronizing unit 3 outputs the demodulated data output from the De-Mapper 2 to a unit in a succeeding stage.

Figure 6:
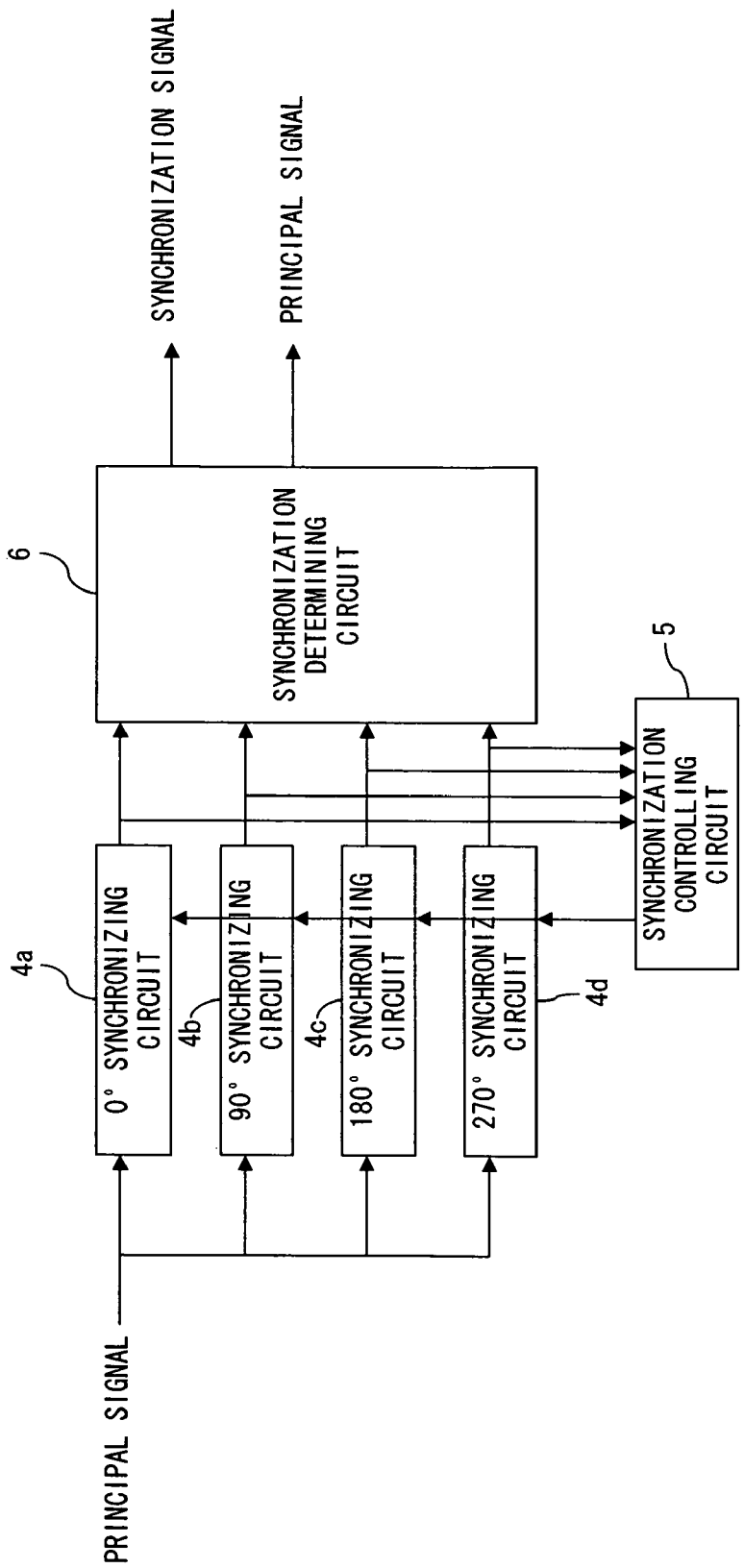
FIG. 6 shows an internal configuration of the synchronizing unit.

FIG. 6 shows an internal configuration of the synchronizing unit 3.

In this figure, a 0° (normal) synchronizing circuit 4a beforehand possesses information of a synchronization byte for normal lock, detects the synchronization byte in the normal lock state from a principal signal (demodulated data), and outputs "H" as a synchronization signal when verifying that the synchronization byte is repeated a predetermined number of times. Explaining based on the above described example of FIG. 4, the synchronization bytes in the normal lock state (low-order 4 bits here) "8" → "7" →"7"→"7"→"7"→"7"→ "7"→"7"→"8" . . . are detected, and "H" is output when it is verified that the synchronization bytes are repeated by a predetermined number of times. When the synchronization signal of "H" is output from the 0° synchronizing circuit 4a as described above, this means that frame synchronization is detected in the normal lock state.

A 90° synchronizing circuit 4b beforehand possesses information of a synchronization byte in a pseudo lock state where a phase shifts in units of 90° (rotates by 90° in the counterclockwise direction) every one symbol. This circuit detects such a synchronization byte in the pseudo lock state from a principal signal, and outputs "H" as a synchronization signal when verifying that the synchronization byte is repeated a predetermined number of times. Explaining based on the above described example of FIG. 4, the synchronization bytes (low-order 4 bits only) "8"→"3", →"B"→"F"→"7"→"7"→ "B"→"F"→"8" . . . in the pseudo lock state where a phase shifts in units of 90° every one symbol are detected, and "H" is output as a synchronization signal when it is verified that the synchronization bytes are repeated a predetermined number of times. If the synchronization signal of "H" is output from the 90° synchronizing circuit 4b as described above, this means that frame synchronization is detected in the pseudo lock state where the phase shifts in units of 90° every one symbol.

A 180° synchronizing circuit 4c beforehand possesses information of a synchronization byte in a pseudo lock state where a phase shifts in units of 180° (rotates by 180°) every one symbol. This circuit detects such a synchronization byte in the pseudo lock state from a principal signal, and outputs "H" as a synchronization signal when verifying that the synchronization byte is repeated a predetermined number of times. Explaining based on the above described example of FIG. 4, the synchronization bytes (low-order 4 bits only) "8"→"B"→"7"→"B"→"7"→"B"→"7"→"B"→"8" . . . in the pseudo lock state where the phase shifts in units of 180° every one symbol are detected, and "H" is output as a synchronization signal when it is verified that the synchronization bytes are repeated a predetermined number of times. If the synchronization signal of "H" is output from the 180° synchronizing circuit 4c as described above, this means that frame synchronization is detected in the pseudo lock state where the phase shifts in units of 180° every one symbol.

A 270° synchronizing circuit 4d beforehand possesses information of a synchronization byte in a pseudo lock state where a phase shifts in units of 270° (−90°) (rotates by 270° in the counterclockwise direction, or by 90° in the clockwise direction) every one symbol. This circuit detects such a synchronization byte in the pseudo lock state from a principal signal, and outputs "H" as a synchronization signal when verifying that the synchronization byte is repeated a predetermined number of times. Explaining based on the above described example of FIG. 4, a synchronization byte (low-order 4 bits only) "8"→"F"→"B"→"3"→"7"→"F"→"B"→"3"→"8" . . . in the pseudo lock state where the phase shifts in units of 270° (−90°) every one symbol is detected, and "H" is output as a synchronization signal when it is verified that the synchronization byte is repeated a predetermined number of times. If the synchronization signal of "H" is output from the 270° synchronizing circuit 4d as described above, this means that frame synchronization is detected in the pseudo lock state where the phase shifts in units of 270° (−90°) every one symbol.

Note that the synchronization signal output from each of the synchronizing circuits 4 (4a, 4b, 4c, and 4d) is input to a synchronization controlling circuit 5 and a synchronization determining circuit 6.

Here, the configuration and the operations of each of the synchronizing circuits 4 are described in further detail with reference to FIGS. 7A and 7B. The configurations and the operations of the synchronizing circuits 4 are identical except that the values of synchronization bytes to be detected are different. Therefore, only the synchronizing circuit 4a is described as a representative.

Figure 7A:
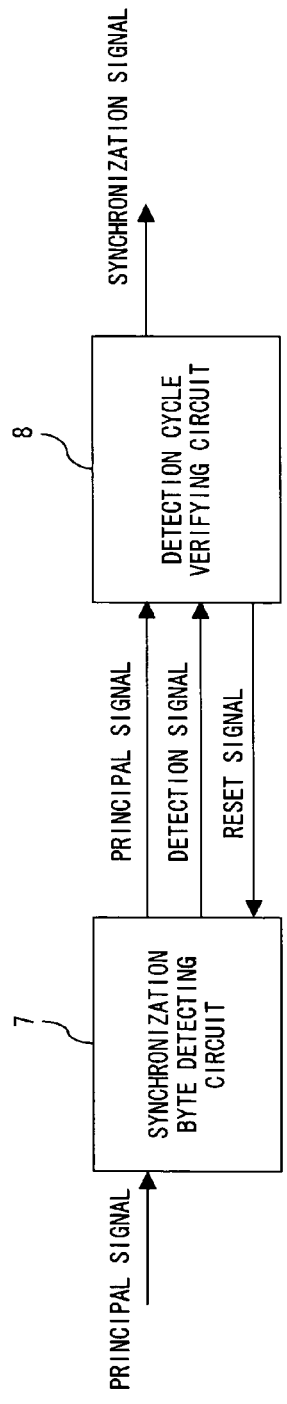
FIG. 7A shows an internal configuration of a synchronizing circuit.
Figure 7B:
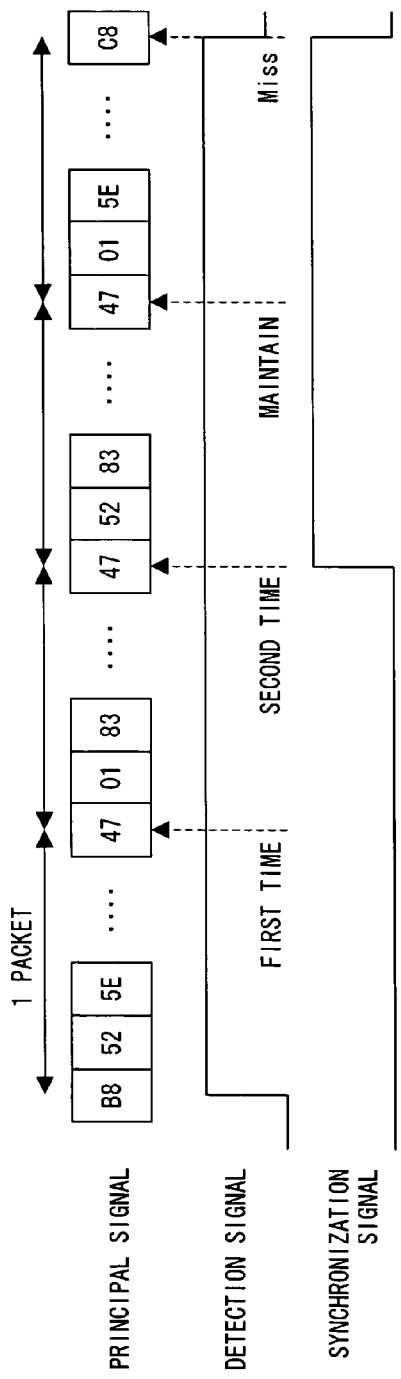
FIG. 7B shows one example of operations of the synchronizing circuit.

FIG. 7A shows the internal configuration of the synchronizing circuit 4a, whereas FIG. 7B shows one example of its operations.

In FIGS. 7A and 7B, a synchronization byte detecting circuit 7 detects from a principal signal (demodulated data) the synchronization bytes in the normal lock state "B8", "47", "47", . . . . If "B8" is firstly detected at the time of detecting these synchronization bytes, "H" is output as a detection signal. Thereafter, a subsequent synchronization byte is detected every 204 bytes, and "L" is output as a detection signal if a detection miss occurs. Additionally, the synchronization byte detecting circuit 7 restarts to detect a synchronization byte in the normal lock state from "B8" when the pulse of "H" is input from a detection cycle verifying circuit 8 as a reset signal. Furthermore, the synchronization byte detecting circuit 7 outputs an input principal signal to the detection cycle verifying circuit 8.

The detection cycle verifying circuit 8 outputs "H" as a synchronization signal when verifying that the detection of the synchronization byte is repeated for a predetermined number of cycles based on the principal signal and the detection signal, which are output from the synchronization byte detecting circuit 7. In the example shown in FIG. 7B, the frame synchronization is defined to be detected if synchronization bytes equivalent to 2 packets are detected. Therefore, "H" is output as a synchronization signal when it is verified that the detection of the synchronization byte is repeated for 2 cycles (the second time shown in FIG. 7B). Here, for ease of explanation, the frame synchronization is defined to be taken if synchronization bytes equivalent to 2 packets are detected. For actual use, however, frame synchronization is defined to be taken if synchronization bytes equivalent to a lot more data amount (such as 5 frames) are detected. Additionally, the detection cycle verifying circuit 8 outputs "L" as a synchronization signal when detecting that the detection signal makes a transition from "H" to "L", and also outputs the pulse of "H" to the synchronization byte detecting circuit 7 as a reset signal.

In FIG. 6, the synchronization controlling circuit 5 outputs a control signal to any of the synchronizing circuits 4 according to the synchronization signal output from the synchronizing circuit 4 to control the driving of the corresponding synchronizing circuit 4. More specifically, the synchronization controlling circuit 5 performs an exclusive operation control to drive all of the synchronizing circuits 4 when detecting that all of the synchronizing circuits 4 output the synchronization signal of "L", or to stop the driving of the synchronizing circuits other than the synchronizing circuit, which outputs the synchronization signal of "H", when detecting that any of the synchronizing circuits 4 outputs the synchronization signal of "H".

Here, the operations of the synchronization controlling circuit 5 are further described in detail with reference to FIG. 8.

This figure shows one example of the operations of the synchronization controlling circuit 5.

In this figure, synchronization signals, which are output from the respective synchronizing circuits 4a, 4b, 4c, and 4d are represented respectively as synchronization signals 0°, 90°, 180°, and 270°. Additionally, control signals, which are output respectively to the synchronizing circuits 4a, 4b, 4c, and 4d, are represented respectively as control signals 0°, 90°, 180°, and 270°. Each of the synchronizing circuits 4 is driven if an input control signal is "L", and stopped if an input control signal is "H".

Figure 8:
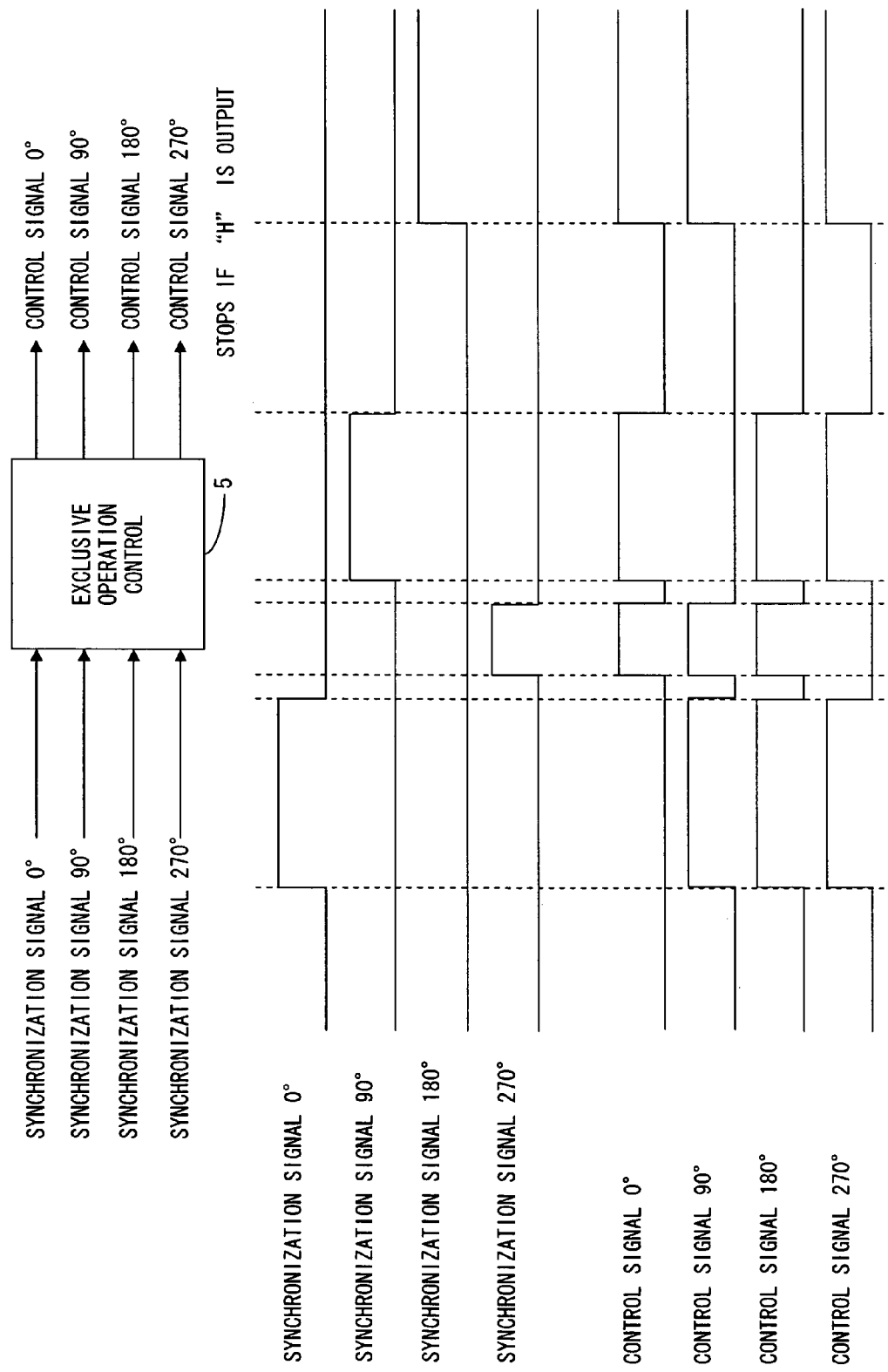
FIG. 8 shows one example of operations of a synchronization controlling circuit.

As shown in FIG. 8, the synchronization controlling circuit 5 outputs "H" respectively as the control signals 90°, 180°, and 270° except for the control signal 0° to stop the driving of the synchronizing circuits 4b, 4c, and 4d except for the synchronizing circuit 4a, if the circuit detects that, for example, the normal lock state occurs and the synchronization signal 0° of "H" is output from the synchronizing circuit 4a when all of the synchronization signals 0°, 90°, 180°, and 270° are "L".

Or, the synchronization controlling circuit 5 outputs "L" respectively as the control signals 0°, 90°, 180°, and 270° to drive all of the synchronizing circuits 4, when the circuit detects that all of the synchronization signals 0°, 90°, 180°, and 270° make a transition to "L".

Figure 9:
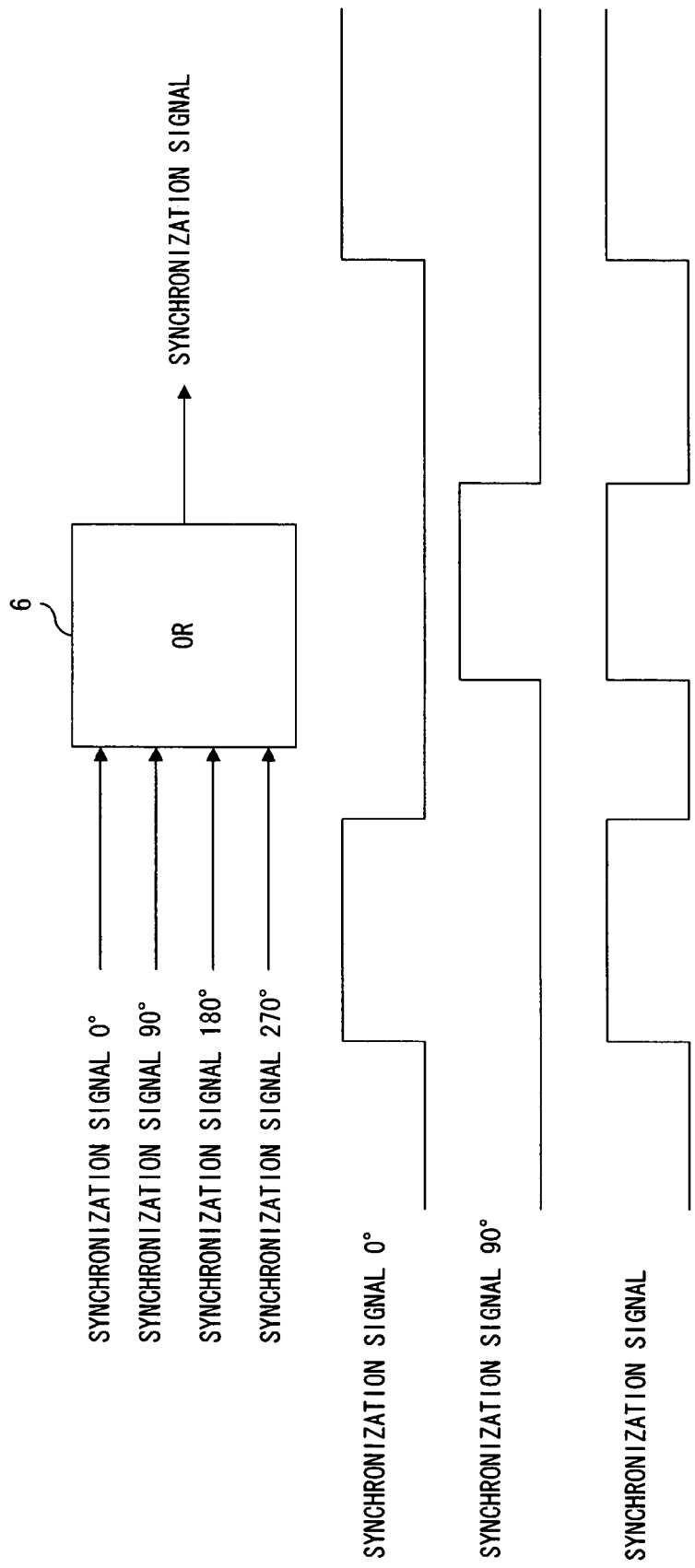
FIG. 9 shows one example of operations of a synchronization determining circuit.

In FIG. 6, when any of the synchronizing circuits 4 outputs the synchronization signal of "H", the synchronization determining circuit 6 outputs "H" as a synchronization signal. Namely, the synchronization determining circuit 6 is configured to OR the outputs of the synchronizing circuits 4 as shown in FIG. 9. In FIG. 9, the waveforms of the synchronization signals 180° and 270° are not shown. Additionally, the synchronization determining circuit 6 determines whether the frame synchronization is taken either in the normal lock state or in the pseudo lock state where the phase shifts in units of 0°, 90°, 180°, or 270° every one symbol by determining whether or not any of the synchronizing circuits 4 outputs the synchronization signal of "H". Furthermore, the synchronization determining circuit 6 outputs a principal signal input to the synchronizing unit 3 to a unit in a succeeding stage.

With the above described configuration of the synchronizing unit 3, frame synchronization can be taken without performing a conventional process for once releasing a lock and for making a lock again occur even if the pseudo lock state, where the phase shifts in units of 0°, 90°, 180°, or 270° every one symbol, occurs. As a result, an overhead caused by the pseudo lock can be reduced.

Additionally, it can be determined whether the frame synchronization is taken either in the normal lock state or in the pseudo lock state where the phase shifts in units of 90°, 180°, or 270° every one symbol. Therefore, data the phase of which rotates in the pseudo lock state can be restored to a normal state by adjusting the data conversion, which is performed by the De-Mapper 2, from parallel data of I and Q into serial data (such as the conversion from I and Q values shown in FIG. 3 into data) according to the result of the determination. For example, if the demodulating unit according to this preferred embodiment adopts a QAM method conforming to DVB-C (DVB: Digital Video Broadcasting), data the phase of which rotates can be restored to a normal state by adjusting the high-order 2 bits of the data represented by one symbol.

In this preferred embodiment, the synchronizing circuits 4b, 4c, and 4d are provided, and the synchronization determining circuit 6 is enabled to determine in which of the 3 types of the pseudo lock states the frame synchronization is taken. However, for example, one or two of the synchronizing circuits 4b, 4c, and 4d may be provided, and the synchronization determining circuit 6 may be enabled to determine in which of one or two types of the pseudo lock states the frame synchronization is taken.

Additionally, in this preferred embodiment, the synchronization byte in the pseudo lock state, which is detected by the synchronizing unit 3, must be determined based on the following matters.

Actual transmission data is transmitted not in units of bytes but in the form of a bit stream. Accordingly, also a synchronization byte must be detected and extracted from serial data. For example, the synchronizing circuit 4a extracts the synchronization bytes "B4" and "47" from serial data shown in FIG. 10. In this case, the synchronizing circuit 4a detects the synchronization bytes while shifting the serial data one bit by one bit, such that 8 bits from the first bit are "D5", 8 bits from the second bit are "AB", and 8 bits from the third bit are "57". In the example shown in this figure, 8 bits (8 bits indicated with *) from the sixth bit are "B8", which will be detected as a synchronization byte.

Figure 11:
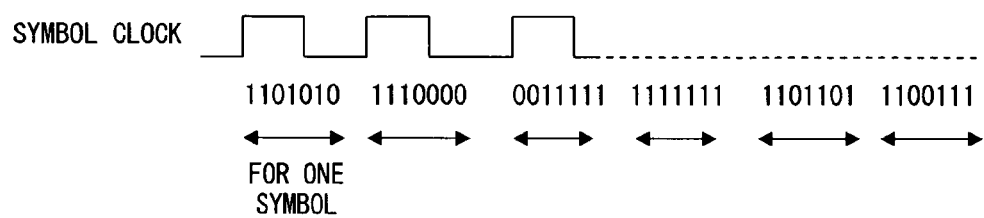
FIG. 11 shows an example where a data pattern is partitioned every one symbol.
Figure 12:
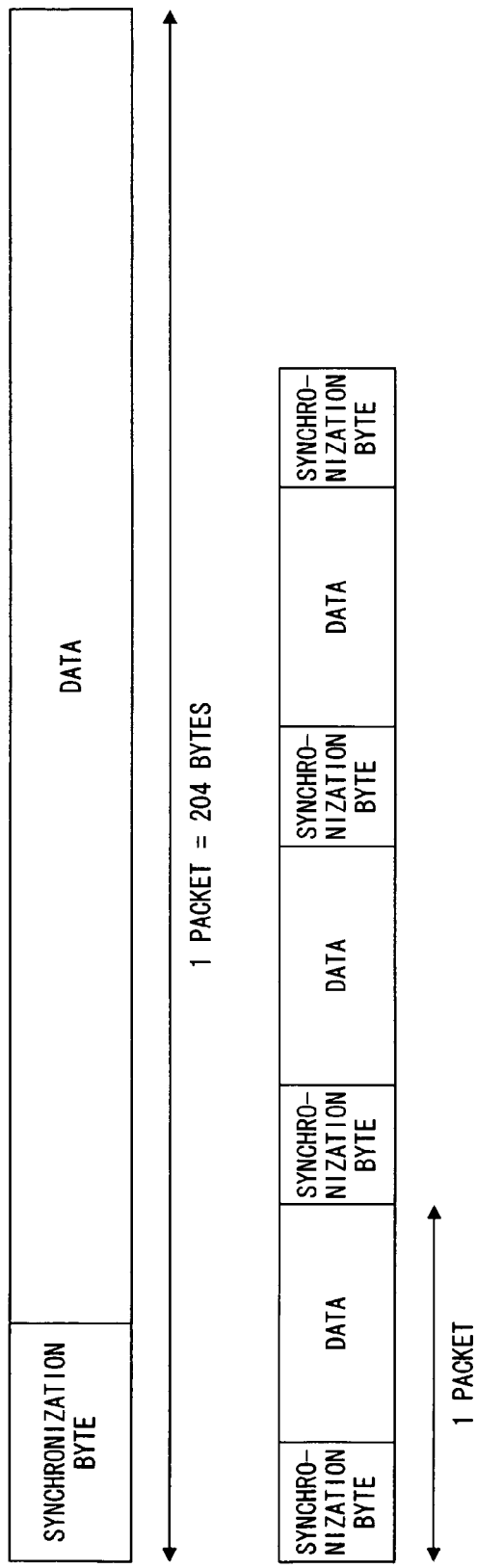
FIG. 12 shows a configuration of one packet.

Additionally, a complex relationship also exists between a modulation method and a symbol clock. By way of example, in the case of 16QAM shown in FIG. 3, one symbol implements 4 bits. In the cases of 32QAM, 64QAM, 128 QAM, and 256QAM, one symbol implements 5 bits, 6 bits, 7 bits, and 8 bits respectively. By way of example, in the case of 128QAM, data of 7 bits is output by one symbol. Therefore, the above described data pattern shown in FIG. 10 is partitioned every one symbol as shown in FIG. 11.

Figure 4:
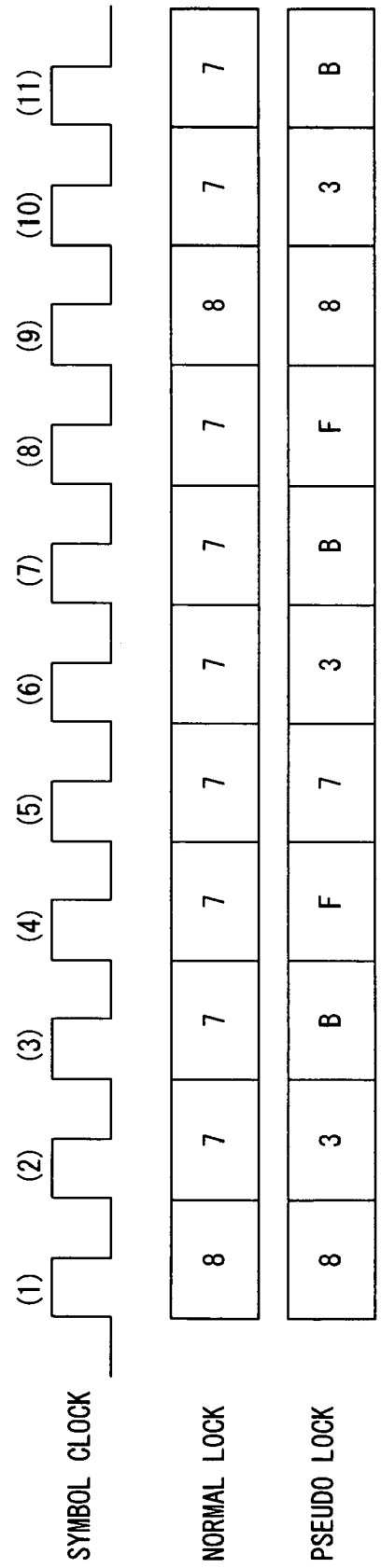
FIG. 4 explains another example of the pseudo lock.

Furthermore, although data portions except for the synchronization bytes are omitted for simplification in the above described example of FIG. 4, also the data portions must be originally considered. In this preferred embodiment, one packet is configured by a total of 204 bytes composed of a synchronization byte and data. Accordingly, a synchronization byte appears every 204 bytes, which exerts an influence on a rotation position in a pseudo lock state.

Specific examples of synchronization bytes in a pseudo lock state in the respective cases of 16QAM, 128QAM, and 256QAM are described next based on the above matters.

The case of 16QAM is firstly described with reference to FIG. 13. The example of this figure is an example of a case where a symbol clock coincides with the beginning of a synchronization byte in the pseudo lock state where the phase shifts in units of 90° (rotates by 90° in the counterclockwise direction) every one symbol. In the case of 16QAM, data of 4 bits is output every one symbol. Accordingly, data of 2 symbols is required to configure 8 bits of a synchronization byte, and low-order 4 bits are influenced by the pseudo lock. Additionally, the number of rotations of the next synchronization byte, which appears after 204 bytes, is obtained with (204*8)/4, and its rotation position results in (204*8)/4% 4=0 (% indicates a remainder operation for calculating a remainder), so that the position restores to the original position.

Figure 13:
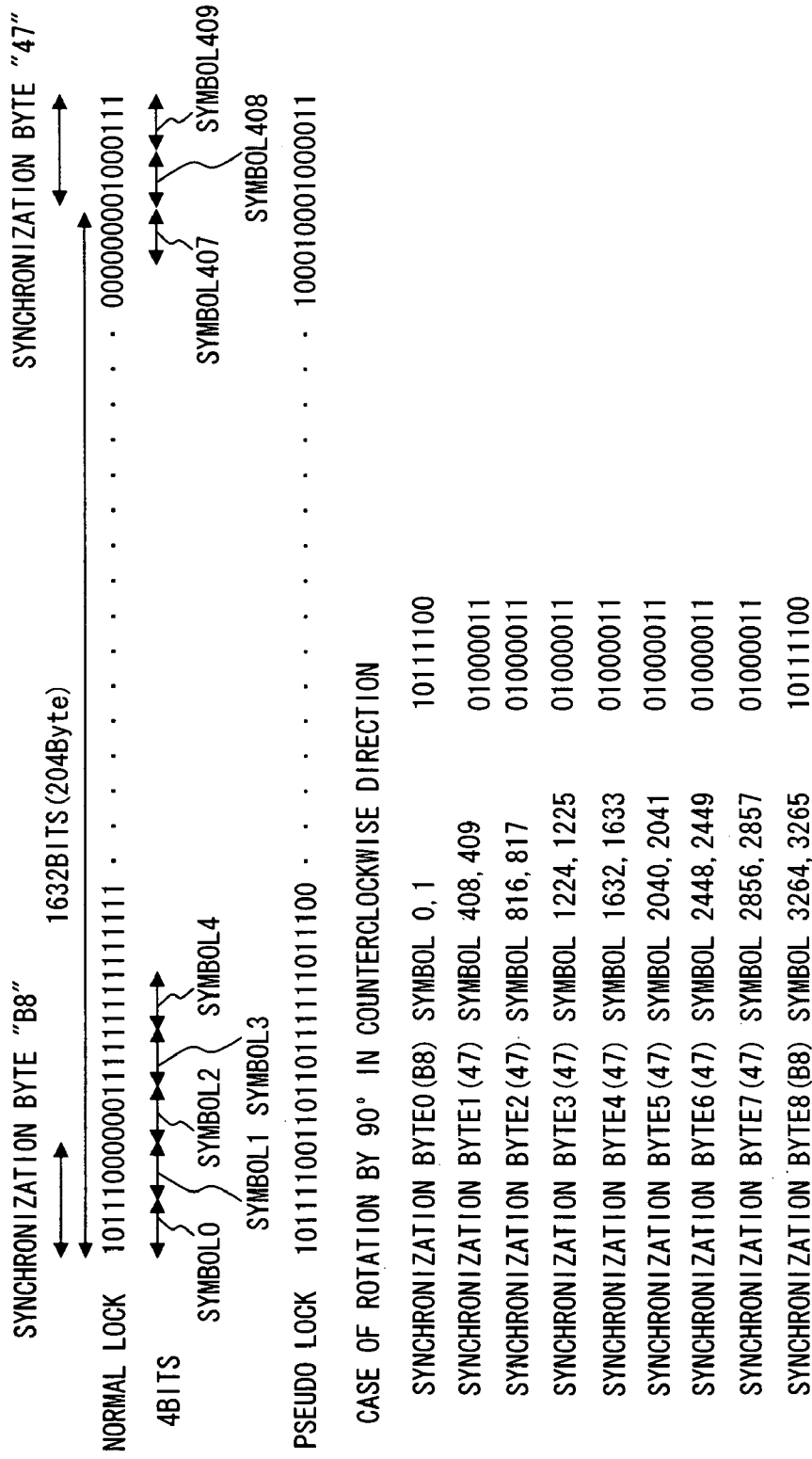
FIG. 13 explains one example of synchronization bytes in a pseudo lock state in the case of 16QAM.

In the example shown in FIG. 13, for the expected value "B8", "B" is output as expected since "B" of the high-order 4 bits is not influenced by the pseudo lock. However, for the succeeding low-order 4 bits, their value results in "C" since the symbol clock proceeds by 1, and the value changes due to the phase rotated by 90° relative to the expected value "8".

Also for the next synchronization byte, for the expected value "47", "4" of the high-order 4 bits remains unchanged, and "7" of the low-order 4 bits is influenced by the pseudo lock, and "3" is output.

As a result, the synchronization bytes in the normal lock state "B8"→"47"→ "47" →"47" →"47"→"47"→"47" "47"→ "B8" . . . change to "BC" → "43"→ "43" → "43"→ "43"→"43"→"43"→"43"→"BC". . . in the pseudo lock state where the phase shifts in units of 90° (rotates by 90° in the counterclockwise direction) every one symbol.

Figure 14:
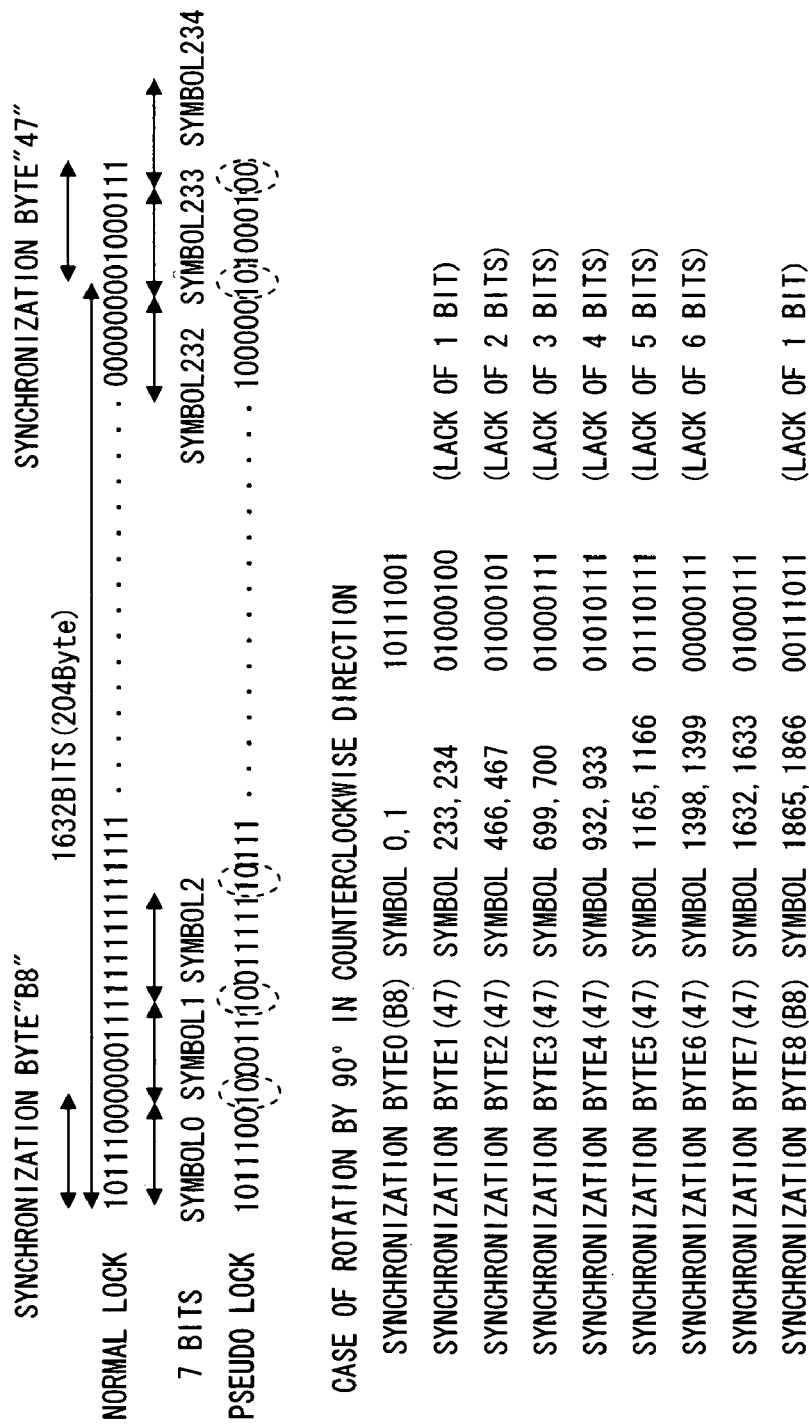
FIG. 14 explains one example of synchronization bytes in the pseudo lock state in a case of 128QAM.

The case of 128QAM is described next with reference to FIG. 14. The example of this figure is also an example of a case where a symbol clock coincides with the beginning of a synchronization byte in the pseudo lock state where the phase shifts in units of 90° (rotates by 90° in the counterclockwise direction) every one symbol. In the case of 128QAM, data of 7 bits is output every one symbol. Accordingly, the rotation position of the next synchronization byte, which appears after 204 bytes, is obtained with (204*8)/7% 4=1, and the phase rotates by 90° relative to the expected value. Additionally, since 204*8=1632 bits cannot be divided by 7 bits, the synchronization byte after 204 bytes straddles two symbols. 1632% 7=1 is obtained, and 1 bit is lacking. This indicates that the next synchronization byte is configured by 2 symbols such as 233 and 234 as shown in FIG. 14. At this time, the phase of the symbol 233 rotates by 90° in the counterclockwise direction, and the phase of the symbol 234 further rotates by 90° in the counterclockwise direction. Subsequent synchronization bytes are considered in a similar manner, which results in the synchronization bytes shown in FIG. 13.

Namely, the synchronization bytes in the normal lock state "B8" →"47" →"47" → "47"→ "47" → "47" →"47"'"47"→ "B8" . . . change to "B9"→"44"→"45"→"47"→"57"→ "77"→"07"→"47"→"3B" . . . in the pseudo lock state where the phase shifts in units of 90° (rotates by 90° in the counterclockwise direction) every one symbol.

If each synchronization byte shifts one bit by one bit due to one symbol composed of 7 bits as in the case of 128QAM, the number of patterns of synchronization bytes to be detected increases, leading to a disadvantage in the scale of a circuit. Accordingly, the existence of a synchronization byte is verified every 8 frames by using the characteristic that the same synchronization byte pattern is repeated every 8 frames in the case of 128QAM, whereby the number of the patterns of synchronization bytes can be reduced. In this case, since a position where the same synchronization byte pattern appears can be guessed, not units of 204-byte packets but a cycle in which the same synchronization pattern appears is processed as verification timing.

Figure 15:
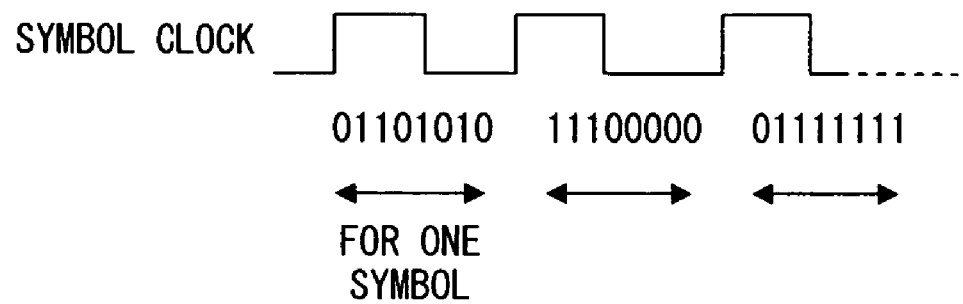
FIG. 15 shows one example of a case where a symbol clock and the beginning of a synchronization byte shift by 6 bits in a case of 256QAM.

The case of 256QAM is described next with reference to FIGS. 15 and 16. In the case of 256QAM, data of 8 bits is output every one symbol. Accordingly, if a symbol clock coincides with the beginning of a synchronization byte, the number of rotations of the next synchronization byte, which appears after 204 bytes, is obtained with (204*8)/8, and its rotation position becomes (204*8)/4% 4=0, so that the position restores to the original position.

However, the symbol clock and the beginning of a synchronization byte do not always coincide with in this embodiment and also in the above described cases of 16QAM and 128QAM. For example, as in the case of 256QAM shown in FIG. 15, the symbol clock and the beginning of the synchronization byte sometimes shift by 6 bits.

If the demodulating unit is of a QAM method conforming to DVB-C, the high-order 2 bits of data represented by one symbol are determined by a quadrant where the symbol exists of an IQ plane. Since a quadrant shift occurs in a pseudo lock state, the high-order 2 bits change. Therefore, it is sufficient to consider the portion of the high-order 2 bits. A simple method is to prepare all of patterns where the high-order 2 bits change.

By way of example, in the case of 256QAM, patterns used when the high-order 2 bits of data represented by one symbol change in each of 0-, 1-, 2-, 3-, 4-, 5-, 6-, and 7-bit shifts for the synchronization byte "B8" become those shown in FIG. 16, and their number totals to 17. In this figure, the high-order 2 bits of each of the patterns are enclosed with a square. For the synchronization byte "B8", the synchronizing unit may be configured to be able to recognize its 17 patterns.

In the meantime, also considered is a method for recognizing bits left unchanged with a pseudo lock without recognizing bits changed with the pseudo lock by masking the bits, and for detecting frame synchronization.

Second Preferred Embodiment

A synchronizing apparatus according to a second preferred embodiment of the present invention is described next.

A synchronizing unit, which is the synchronizing apparatus according to this preferred embodiment, is comprised by a receiving device in a system for modulating/demodulating data with a QPSK method, and for transmitting the data. This receiving device has the configuration shown in FIG. 5 similar to that in the first preferred embodiment. Note that, however, the synchronizing unit according to this preferred embodiment can detect frame synchronization by detecting a synchronization byte in a normal lock state, and can detect frame synchronization by detecting a synchronization byte in a pseudo lock state where a phase shifts in units of 90° (rotates by 90° in the counterclockwise direction) every one symbol. The configuration of data to be transmitted is the same as that shown in the above described FIG. 1.

Figure 2:
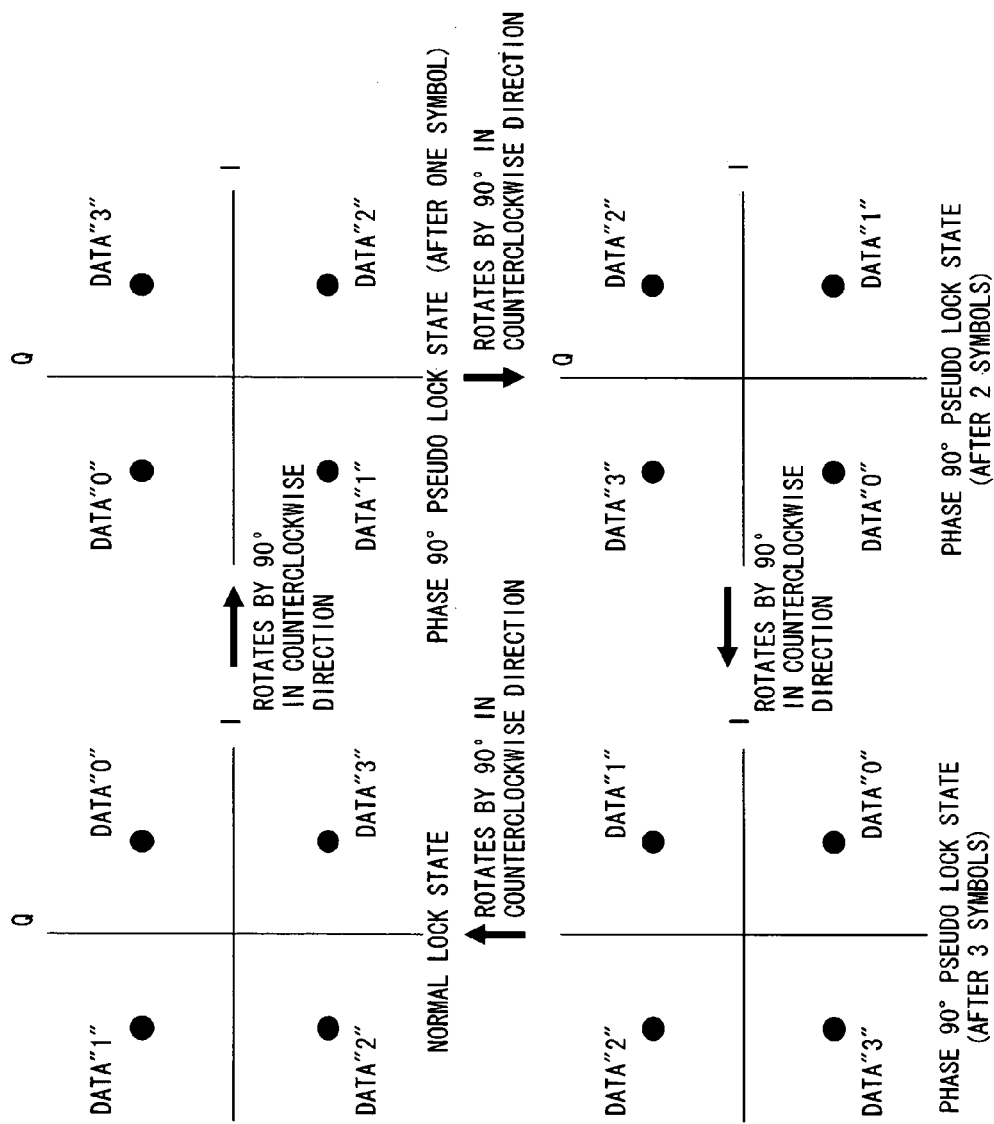
FIG. 2 explains one example of pseudo lock.

Assume that data at a symbol point on an IQ plane in the normal lock state is data at a symbol point in the upper left IQ plane shown in the above described FIG. 2 in this preferred embodiment. In this case, the number of patterns of a synchronization byte in the pseudo lock state, which are detected by the synchronizing unit according to this preferred embodiment, in consideration of bit shifts is 8 as shown in FIG. 17. Details of the patterns of the synchronization byte "B8" at this time are shown in FIG. 18. In the patterns of 0-, 1-, 2-, 3-, 4-, 5-, 6-, and 7-bit shifts shown in this figure, 2 bits shown in (1) indicates that a phase does not shift (no rotation), 2 bits shown in (2) indicates that the phase rotates by 90°, 2 bits shown in (3) indicates that the phase rotates by 90°×2, and 2 bits shown in (4) indicates that the phase rotates by 90°×3.

The synchronizing unit according to this preferred embodiment starts to detect frame synchronization when detecting the synchronization byte "B8" in the normal lock state or any of the 8 patterns of the synchronization byte ("83", "24", ..., "D4", "CE") in the pseudo lock state, which are shown in FIG. 18.

Figure 19:
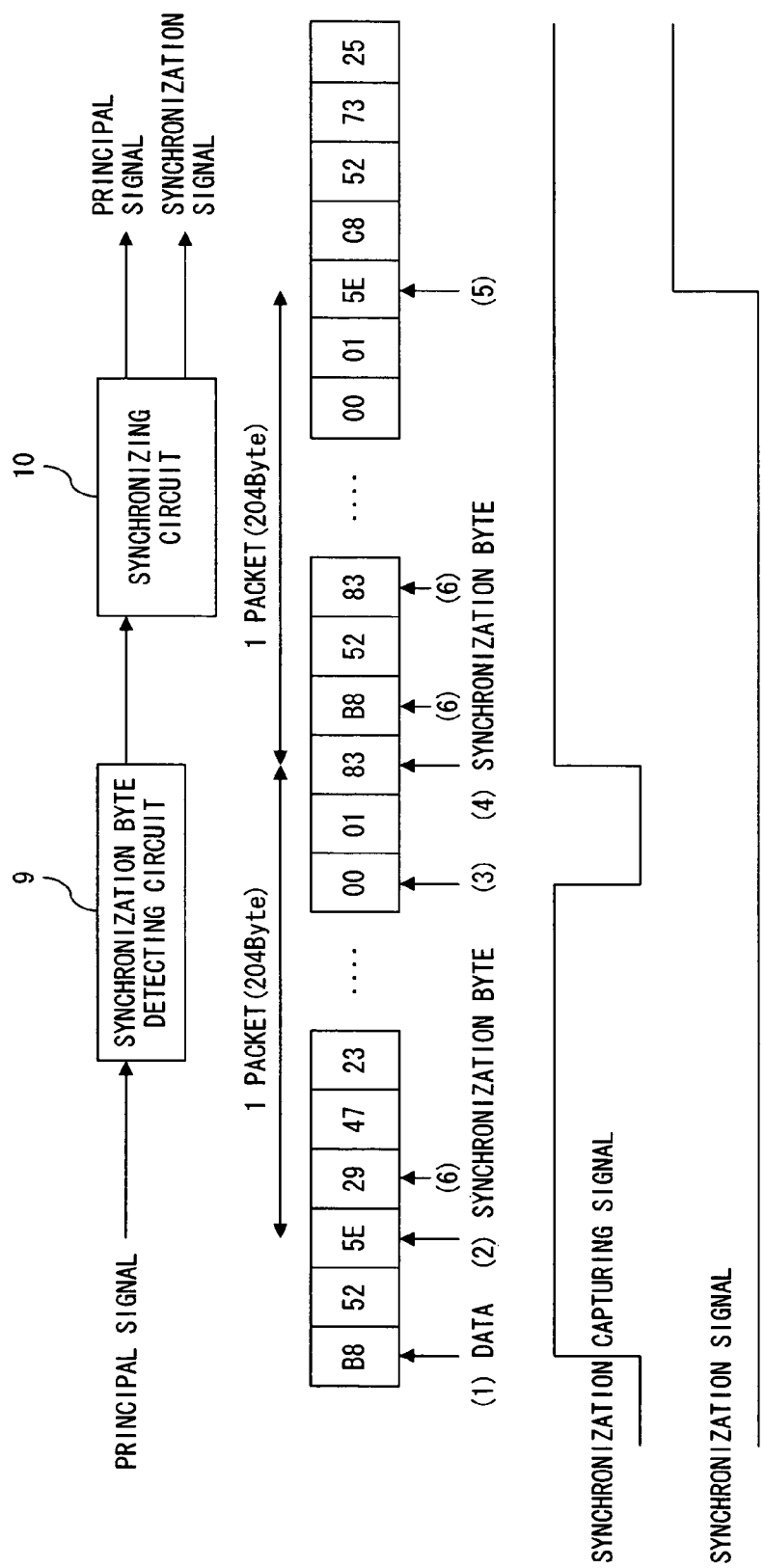
FIG. 19 shows one example of a configuration and operations of the synchronizing unit according to the second preferred embodiment.

FIG. 19 shows one example of the configuration and the operations of the synchronizing unit according to this preferred embodiment.

In this figure, a synchronization byte detecting circuit 9 extracts the synchronization byte shown in FIG. 17 from an input principal signal (serial data stream). A synchronizing circuit 10 monitors the synchronization byte, and outputs "H" as a synchronization signal if a predetermined number of frames is cleared.

For example, if the synchronization byte detecting circuit 9 detects the byte data "B8", which firstly appears in (1), it outputs "H" as a signal (synchronization capturing signal) for requiring the synchronizing circuit 10 to capture this byte data as shown in FIG. 19. Upon receipt of that signal, the synchronizing circuit 10 verifies whether or not a synchronization byte exists after 204 bytes. Note that a true synchronization byte "5E" shown in (2) exists immediately after the byte data "B8" shown in (1), but it is ignored because the synchronizing circuit 10 is under capturing. Similarly, byte data "29", which is shown in (6) and matches the above described synchronization byte, exists, but it is also ignored for the same reason. When a position (shown in (3)) after 204 bytes from the byte data "B8" shown in (1) is verified, it is not the expected synchronization byte "47", which proves that the byte data "B8" is not a synchronization byte. Then, the synchronization capturing signal is reset, and the synchronizing circuit 10 enters a state of recapturing a synchronization byte. Thereafter, a synchronization byte "83" shown in (4) appears, this byte is detected, and it is verified that a synchronization byte "5E" exists after 204 bytes (in a position shown in (5)). Since the expected synchronization byte "5E" exists in the position shown in (5), the synchronizing circuit 10 detects this synchronization byte, which means that frame synchronization is detected, and outputs "H" as a synchronization signal (note that, however, synchronization bytes equivalent to one packet are detected and the synchronization signal of "H" is output for ease of explanation in this operation example).

With the above described configuration of the synchronizing unit, frame synchronization can be taken without performing a conventional process for once releasing a lock and for making a lock again occur, even if the pseudo lock state, where a phase shifts in units of 90° every one symbol, occurs. As a result, an overhead caused by the pseudo lock can be reduced.

Additionally, whether the frame synchronization is taken either in the normal lock state or in the pseudo lock state can be determined according to the pattern of the first synchronization byte when synchronization detection starts. Therefore, data conversion from parallel data of I and Q into serial data, which is made by the De-Mapper arranged in the preceding stage of the synchronizing unit, is adjusted, whereby data the phase of which rotates in the pseudo lock can be restored to a normal state.

Third Preferred Embodiment

A synchronizing apparatus according to a third preferred embodiment of the present invention is described next.

A synchronizing unit, which is the synchronizing apparatus according to this preferred embodiment, is comprised by a receiving device in a system for digital-modulating/demodulating and transmitting data in a similar manner as in the first preferred embodiment. This receiving device conforms to DVB-C, and has the configuration shown in FIG. 5 similar to that in the first preferred embodiment. Note that, however, data to be transmitted is defined to be data having a configuration where a fixed data pattern such as a header of MPEG (Moving Picture Experts Group) succeeds immediately after a synchronization byte like a transport stream (TS), in this preferred embodiment. In correspondence with this, the synchronizing unit according to this preferred embodiment is intended to verify the rotation state of a pseudo lock state by using the fixed data portion.

Figure 20:
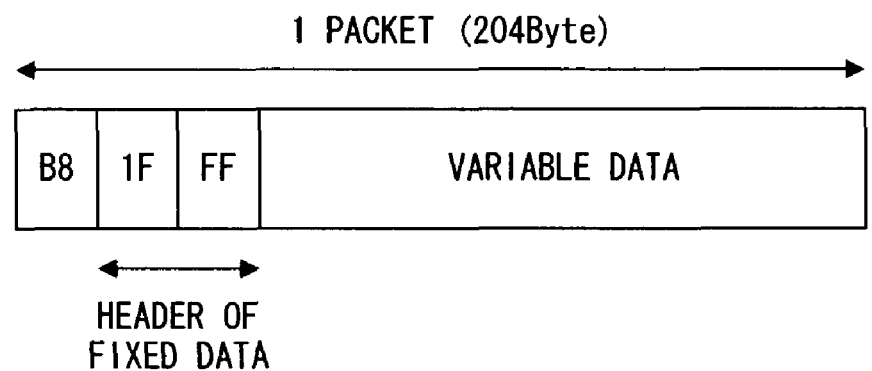
FIG. 20 shows one example of a TS packet where a fixed data pattern succeeds immediately after a synchronization byte.

For example, data is transmitted in units of 8 bits in the case of 256QAM. In this case, in the example of the TS packet shown in FIG. 20, the rotation state of the pseudo lock state can be grasped by obtaining the next byte data ("1F" in the normal lock state) and by verifying its change, when the synchronization byte "B8" is detected. Additionally, the change of the next byte data is verified, whereby it can be determined whether synchronization is taken either in the normal lock state or in the pseudo lock state. Namely, the rotation state of the pseudo lock state influences the high-order 2 bits of data represented by one symbol. Therefore, if "1F" is obtained as byte data immediately after the synchronization byte "B8", no rotation is determined, that is, synchronization is determined to be taken in the normal lock state. Or, if "5F" is obtained as byte data immediately after the synchronization byte "B8", synchronization is determined to be taken in the pseudo lock state where the phase shifts with a clockwise rotation, namely, in units of −90° every one symbol since the data shifts from the first quadrant to the fourth quadrant. Or, if "9F" is obtained as byte data immediately after the synchronization byte "B8", synchronization is determined to be taken in the pseudo lock state where the phase shifts with a counter clockwise rotation, namely, in units of 90° every one symbol.

With the above described configuration of the synchronizing unit, frame synchronization can be taken without performing a conventional process for once releasing a lock and for making a lock again occur, even if the pseudo lock state, where a phase shifts in units of 90°, 180°, or −90°(270°) every one symbol, occurs. As a result, an overhead caused by the pseudo lock can be reduced.

Additionally, whether synchronization is taken either in the normal lock state or in any of pseudo lock states can be determined. Therefore, data conversion from parallel data of I and Q into serial data, which is made by the De-Mapper arranged in the preceding stage of the synchronizing unit, is adjusted according to a result of the determination, whereby data the phase of which rotates in the pseudo lock can be restored to a normal state.

Fourth Preferred Embodiment

A synchronizing apparatus according to a fourth preferred embodiment of the present invention is described next.

A synchronizing unit, which is the synchronizing apparatus according to this preferred embodiment, is comprised by a receiving device in a system for modulating/demodulating data with a QPSK method and for transmitting the data.

In this preferred embodiment, the transmitting side of this system beforehand inserts a synchronization byte corresponding to a pseudo lock state in a packet similar to a normal synchronization byte. As the synchronization byte to be inserted, a code with which the same code as the synchronization byte "B8" or "47" in the normal lock state is output in the pseudo lock state is applied. As a result, the synchronizing unit according to this preferred embodiment can cope with a pseudo lock state with one synchronizing circuit, whereby the scale of the circuit can be prevented from being increased.

More specifically, with reference to FIG. 21, byte data assuming the pseudo lock is beforehand inserted after the normal synchronization byte "B8" or "47" in transmission data (a transmission signal shown in this figure). When the byte data enters the pseudo lock state, "B8" or "47" is configured to be output as a principal signal after data conversion made by a De-Mapper 12. In FIG. 21, an IQ demodulating unit 11, the De-Mapper 12, and the synchronizing unit 13 show a portion of the configuration of the receiving device.

In the example shown in FIG. 21, a synchronization byte "77" assuming the pseudo lock state where a phase shifts in units of 90° every one symbol is inserted as the byte data next to the normal synchronization byte "B8" inserted in the transmission data. In this case, these pieces of byte data are "B8" and "77" in the normal lock state unchanged, but they change to "83" and "B8" in the pseudo lock state in the principal signal after the data conversion made by the De-Mapper 12.

The same codes "B8" and "47" as normal synchronization bytes are configured to be output in the pseudo lock state in this way, whereby the synchronizing unit 13 in the succeeding stage can adopt almost the same circuit as a conventional one for detecting synchronization by detecting a synchronization byte in the normal lock state. The reason of referring to as almost the same circuit is that a synchronization position shifts by 1 byte after an original synchronization position, which requires a circuit for adjusting this shift.

Figure 22:
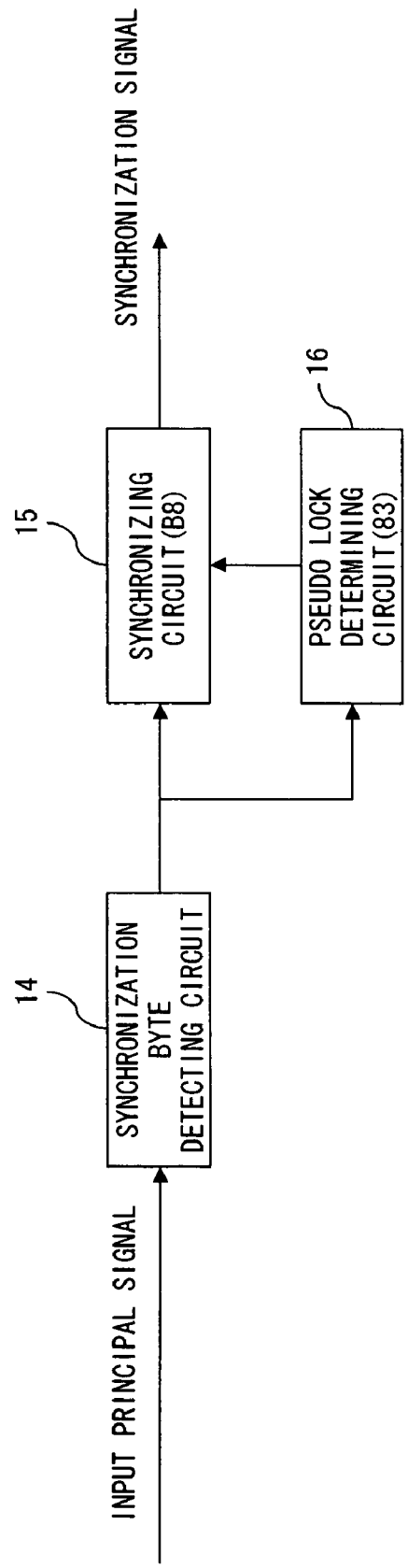
FIG. 22 shows a configuration of a synchronizing unit according to a fourth preferred embodiment.

The synchronizing unit 13 according to this preferred embodiment adopts, for example, the configuration shown in FIG. 22.

In this figure, a synchronization byte detecting circuit 14 extracts a synchronization byte from an input principal signal (serial data stream). A synchronizing circuit 15 monitors the synchronization byte, and outputs a synchronization signal if a predetermined number of frames is cleared. A pseudo lock determining circuit 16 determines the normal lock state or the pseudo lock state by monitoring the byte data, since this circuit knows to which byte data in the pseudo lock state the synchronization byte in the normal lock state changes (for example, the synchronization byte "B8" changes to "83"). Additionally, since a synchronization position shifts by 1 byte after an original synchronization position as described above when the pseudo lock determining circuit 16 determines the pseudo lock state, the synchronizing unit 13 adjusts this shift.

With the above described configuration of the synchronizing unit 13, synchronization can be taken without performing a conventional process for once releasing a lock and for making a lock again occur, if an expected pseudo lock occurs. As a result, an overhead caused by the pseudo lock can be reduced.

Additionally, it can be determined whether the synchronization is taken either in the normal lock state or in an expected pseudo lock state. Therefore, data the phase of which rotates in the pseudo lock state can be restored to a normal state by adjusting the data conversion from parallel data of I and Q into serial data, which is made by the De-Mapper 12, according to a result of the determination.

Up to this point, the present invention is described in detail. However, the present invention is not limited to the above described preferred embodiments. A variety of improvements and modifications can be made within a scope not deviating from the gist of the present invention, as a matter of course.

As described above, according to the present invention, an overhead caused by pseudo lock can be reduced.

What is claimed is:

1. A synchronizing apparatus for detecting synchronization by detecting from demodulated data a synchronization pattern in a normal lock state and a synchronization pattern in a pseudo lock state, the synchronization pattern in the pseudo lock state being different from the synchronization pattern in the normal lock state, the apparatus comprising:

a normal lock synchronization detecting unit to detect synchronization by detecting from the demodulated data the synchronization pattern in the normal lock state; and a pseudo lock synchronization detecting unit to detect synchronization by detecting from the demodulated data the synchronization pattern in the pseudo lock state, wherein said pseudo lock synchronization detecting unit comprises any one or more of a first pseudo lock synchronization detecting unit to detect synchronization by detecting a synchronization pattern in a first pseudo lock state where a phase shifts in units of 90° every one symbol, a second pseudo lock synchronization detecting unit to detect synchronization by detecting a synchronization pattern in a second pseudo lock state where a phase shifts in units of 180° every one symbol, and a third pseudo lock synchronization detecting unit to detect synchronization by detecting a synchronization pattern in a third pseudo lock state where a phase shifts in units of 270° or −90° every one symbol.

2. The synchronizing apparatus according to claim 1, further comprising
a synchronization determining unit to determine whether the synchronization is detected either in the normal lock state or in the pseudo lock state according to results of synchronization detection of said normal lock synchronization detecting unit and said pseudo lock synchronization detecting unit.

3. The synchronizing apparatus according to claim 2, wherein
said synchronization determining unit determines whether the synchronization is detected either in the normal lock state or in any of the first, the second, and the third pseudo lock states according to a result of synchronization detection of said normal lock synchronization detecting unit and a result of synchronization detection of any one or more of said first, said second, and said third pseudo lock synchronization detecting units.

4. The synchronizing apparatus according to claim 2, wherein
data conversion, which is made by a demodulating unit for outputting the demodulated data, from parallel data of I and Q components into serial data, which is the demodulated data, is adjusted according to a determination result of said synchronization determining unit.

5. The synchronizing apparatus according to claim 1, wherein
said pseudo lock synchronization detecting unit detects the synchronization by detecting the synchronization pattern in the pseudo lock state every predetermined data amount.

6. The synchronizing apparatus according to claim 1, wherein
each of any one or more of said first, said second, and said third pseudo lock synchronization detecting units detects the synchronization by detecting the synchronization pattern in the pseudo lock state every predetermined data amount.

7. The synchronizing apparatus according to claim 1, wherein
synchronization is detected by detecting a subsequent synchronization pattern in the normal lock state every predetermined data amount when said normal lock synchronization detecting unit detects a beginning of the synchronization pattern in the normal lock state, or synchronization is detected by detecting a subsequent synchronization pattern in the pseudo lock state every predetermined data amount when said pseudo lock synchronization detecting unit detects a beginning of the synchronization pattern in the pseudo lock state.

8. A synchronizing apparatus for detecting synchronization by detecting from demodulated data a synchronization pattern in a normal lock state and a synchronization pattern in a pseudo lock state, the synchronization pattern in the pseudo lock state being different from the synchronization pattern in the normal lock state,
the apparatus being provided on a receiving side of a system for modulating/demodulating and transmitting data, in which a data pattern that becomes a same value as a synchronization pattern when being demodulated in the pseudo lock state on the receiving side is inserted as a data pattern that succeeds immediately after the synchronization pattern,
the apparatus comprising:
a synchronization detecting unit to detect synchronization by detecting the synchronization pattern in the normal lock state;
a determining unit to determine the pseudo lock state by detecting the synchronization pattern in the pseudo lock state; and
an adjusting unit to adjust a synchronization position when said synchronization detecting unit detects synchronization and said determining unit determines the pseudo lock state.

9. A synchronizing apparatus, which is provided on a receiving side of a system for modulating/demodulating and transmitting data having a configuration where a fixed data pattern succeeds immediately after a synchronization pattern, comprising:
a synchronization pattern detecting unit to detect a synchronization pattern from demodulated data;
a data pattern obtaining unit to obtain a data pattern that succeeds immediately after the synchronization pattern detected by said synchronization pattern detecting unit; and
a determining unit to determine whether synchronization is taken either in a normal lock state or in a pseudo lock state according to the data pattern obtained by said data pattern obtaining unit.

10. The synchronizing apparatus according to claim 9, wherein
said determining unit determines the normal lock state or the pseudo lock state, where a phase shifts in units of 90°, 180°, or 270° (or −90°) every one symbol, according to a value of the data pattern obtained by said data pattern obtaining unit.

11. A synchronizing method, comprising:
using a synchronization detecting unit that detects synchronization by detecting from demodulated data a synchronization pattern in a normal lock state or a synchronization pattern in a pseudo lock state, the synchronization pattern in the pseudo lock state being different from the synchronization pattern in the normal lock state; and
using a synchronization determining unit that determines whether the synchronization is detected either in the normal lock state or in the pseudo lock state according to a detection result of the synchronization, wherein
the synchronization detecting unit detects, as the synchronization pattern in the pseudo lock state, a synchronization pattern in a first pseudo lock state where a phase shifts in units of 90° every one symbol, a synchronization pattern in a second pseudo lock state where a phase shifts in units of 180° every one symbol, or a synchronization pattern in a third pseudo lock state where a phase shifts in units of 270° or −90° every one symbol.

12. The synchronizing method according to claim 11, wherein
the synchronization determining unit detects whether the synchronization is detected either in the normal lock state or in any of the first, the second, and the third pseudo lock states according to the detection result of the synchronization.

13. The synchronizing method according to claim 11, further comprising
adjusting data conversion, which is made by a demodulating unit for outputting the demodulated data, from parallel data of I and Q components into serial data, which is the demodulated data, according to a result determined by the synchronization determining unit.

* * * * *